(12) United States Patent
Ranganathan et al.

(10) Patent No.: US 11,734,379 B1
(45) Date of Patent: Aug. 22, 2023

(54) DYNAMIC SEARCH RESULTS INTERFACE BASED ON PREDICTED USER INTENT

(71) Applicant: Amazon Technologies, Inc., Reno, NV (US)

(72) Inventors: Rahul Ranganathan, Maidstone (GB); Carolina de los Arcos de Pedro, Madrid (ES); Frank Marino, Kirkland, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/344,355

(22) Filed: Jun. 10, 2021

(51) Int. Cl.
*G06F 16/957* (2019.01)
*G06Q 30/0601* (2023.01)
*G06F 3/0485* (2022.01)
*H04L 67/50* (2022.01)

(52) U.S. Cl.
CPC ........ *G06F 16/9577* (2019.01); *G06F 3/0485* (2013.01); *G06Q 30/0603* (2013.01); *G06Q 30/0643* (2013.01); *H04L 67/535* (2022.05)

(58) Field of Classification Search
None
See application file for complete search history.

(56) References Cited

U.S. PATENT DOCUMENTS

| | | | | |
|---|---|---|---|---|
| 6,600,500 B1 * | 7/2003 | Yamamoto | ............ | G06F 3/0481 715/779 |
| 8,117,085 B1 * | 2/2012 | Smith | ................ | G06Q 30/0629 705/26.7 |
| 8,438,052 B1 * | 5/2013 | Chanda | ............... | G06Q 30/0207 705/7.11 |
| 8,660,912 B1 * | 2/2014 | Dandekar | .............. | G06Q 30/02 705/26.1 |
| 10,706,450 B1 * | 7/2020 | Tavernier | ............ | G06F 16/9535 |
| 2005/0198582 A1 * | 9/2005 | Hennum | ............. | G06F 3/04842 715/767 |
| 2008/0092071 A1 * | 4/2008 | Chiu | .................. | G06Q 30/0258 715/764 |
| 2008/0141145 A1 * | 6/2008 | Klausmeier | .......... | G06Q 10/109 715/751 |
| 2009/0150363 A1 * | 6/2009 | Gross | ................... | G06Q 10/107 |
| 2013/0030952 A1 * | 1/2013 | Musgrove | ............... | G10L 21/00 705/26.7 |

(Continued)

*Primary Examiner* — Mandrita Brahmachari
(74) *Attorney, Agent, or Firm* — Hogan Lovells US LLP

(57) ABSTRACT

A method for providing a dynamically adjusted search results interface includes determining a plurality of items from the electronic catalog that meet one or more relevance criteria in response to a search query. The method also includes transmitting instruction to the client device, the instructions causing the client device to display a search results page including a plurality of search results corresponding to the plurality of items. A primary search result of the plurality of search results is displayed in an expanded format and other search results of the plurality of search results are displayed in a minimized format. The method further includes detecting user navigation data with respect to the search results page, determining that the user navigation data meet one or more conditions for collapsing the primary search result from the expanded format to the minimized format, and automatically collapsing the primary search result from the expanded format to the minimized format.

20 Claims, 11 Drawing Sheets

(56) References Cited

U.S. PATENT DOCUMENTS

| | | | |
|---|---|---|---|
| 2015/0058114 A1* | 2/2015 | Yi ..................... | G06Q 30/0272 |
| | | | 705/14.41 |
| 2018/0218431 A1* | 8/2018 | Prendki .............. | G06Q 30/0631 |
| 2019/0114363 A1* | 4/2019 | Cheng ................ | G06F 16/9558 |

* cited by examiner

DYNAMIC SEARCH RESULTS INTERFACE BASED ON PREDICTED USER INTENT

BACKGROUND

Customers are increasingly making large and small purchases on e-commerce websites. A customer navigating an e-commerce website typically attempts to identify a product that meets their needs through browsing categories or by entering a search query. Some e-commerce websites may carry a very large number of products. Even a customer with considerable experience navigating e-commerce websites sometimes experiences difficulty in choosing a product from among tens or hundreds of similar products. The task of shopping online via the web can be unproductive and even frustrating. In response to these difficulties, companies continually strive to make their e-commerce websites more dynamic, compelling, informative, and easier for users to navigate and locate products and related information.

BRIEF DESCRIPTION OF THE DRAWINGS

Various embodiments in accordance with the present disclosure will be described with reference to the drawings, in which.

DETAILED DESCRIPTION

Figure 1:
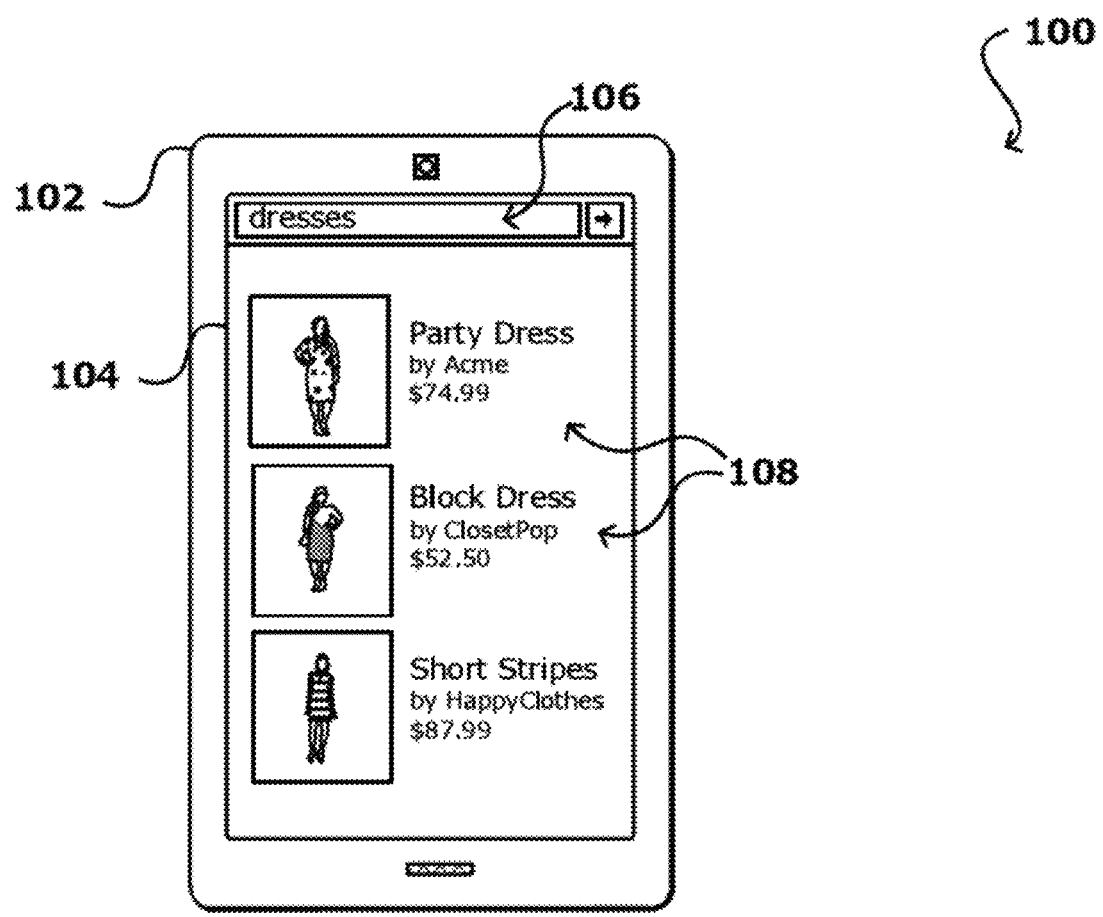
FIG. 1 illustrates an example computing device providing access to an electronic marketplace.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for search engine technology. In particular, various embodiments aim to predict user intent through monitoring various implicit and explicit user interactions, and dynamically modify presentation of search results accordingly.

When a search query is sent from a client device and received at a search engine associated with one or more databases, such as in an e-commerce platform, one or more items are selected as being responsive (i.e., relevant) to the search query based on various models and/or search algorithms. A search results interface (e.g., search results page) is presented at the client device showing one or more search results that correspond to the selected items. For example, the search results may be displayed in a single-row list or a grid. In various embodiments, a primary search result, which may be the best (e.g., most relevant, best match, most popular) search result, is displayed in an expanded format in the results page while the other results on the page are displayed in a minimized format. The minimized format includes a minimum amount of content associated with a search result and the expanded format includes more content than the minimized format. The expanded format also takes up more display space than the minimized format. For example, the expanded format may have a larger product image than the minimized format, more description about the product, various links or buttons that the user can select, and/or other additional content. For example, the expanded format includes some of the information and actions options, such as adding to cart, sharing, favoriting, item options, additional description, etc., that are conventionally only available after a user has clicked into a specific product page from the search results page, leaving the search results page. Thus, the expanded format allows the user to access these additional information and options without leaving the results page, and the user can continue to scroll through the other results without having to click into and back from a separate product page. This can facilitate and quicken the product browsing process and path to purchase.

Once the search results page loads, various types of user interaction data may be monitored and used to determine whether/when to dynamically collapse the primary search result from the expanded format to the minimized format, allowing more search results to be visible in a single frame of view. For example, if it is detected that the user quickly scrolls away from the primary search result 204 (e.g., less than 2 seconds), it may indicate that the user is not interested in the content of the primary search result presented in the expanded format. Thus, the primary search may be automatically collapsed into the minimized format so the user can better view the other results. This allows for more items to be displayed in the list and provides the potential for more options to be visible at once, which may be especially beneficial for users who are searching for a particular item.

FIG. 1 illustrates an example 100 computing device 102 providing access to an electronic marketplace 104, in accordance with various embodiments. Although a tablet computing device is shown in this example, it should be understood that various other types of electronic device that are capable of determining and processing input can be used in accordance with various embodiments discussed herein. These devices can include, for example, smart phones, e-book readers, desktop computers, notebook computers, personal data assistants, video gaming consoles or controllers, smart televisions, and portable media players, wearable computers (e.g., glasses, watches, etc.) among others. Further, the components illustrated can be part of a single device, while at least some components illustrated and otherwise utilized for such a device can be provided as one or more peripheral devices or accessories within the scope of the various embodiments.

In a conventional system, a user can search for items (goods and/or services) in an electronic item catalog of an electronic marketplace. A catalog of items (including each item's description) may be organized into a "browse tree" structure in order to facilitate searching. A browse tree permits users to "browse" through various items, which are arranged in the form of a hierarchical tree. The browse tree may be displayed via a user interface as a collection of hyperlinks, each hyperlink corresponding to a section of the tree. A user can find an item by navigating through the various nodes of the browse tree.

Additionally, in many situations, the electronic marketplace may provide a search interface 106 that enables a user to search for items. The search interface may return search results based on relevance of particular items to the customer's search query. For example, FIG. 1 illustrates an example display of content on a display screen 104 of a computing device 102. In this example, a search query has been received and a set of search results 108 determined and returned for presentation in response to the request. In this example, the user has submitted a query including the keyword "dresses" and the returned search results have been determined to be relevant in some way to the keyword. This can be due to a categorization of the results, keywords associated with the results, or tags applied to the result, among other such options. The user can scroll or otherwise navigate through the results to determine whether any of the results are of interest to the user.

When a user submits a search query, such as shown in FIG. 1, various processes are performed in order to produce a list of search results that are relevant to the search query. In some embodiments, the search results may also be ranked or arranged in a particular manner, such as by descending relevance or mixed relevance. In some search systems, a trained search model may be used to determine which products to show in response to a certain search query and in which order. Typically, the search results are presented in a list, such as a single column list showed in FIG. 1. Alternatively, search results may also be presented in a grid configuration with multiple columns and rows. In either configuration, typically, all the search results on a page have the same format. The user navigates the page by scrolling through the results. In some instances, users may even immediately scroll out of habit as soon as the search results load. This may cause them to miss or glaze over some search results.

Figure 2A:
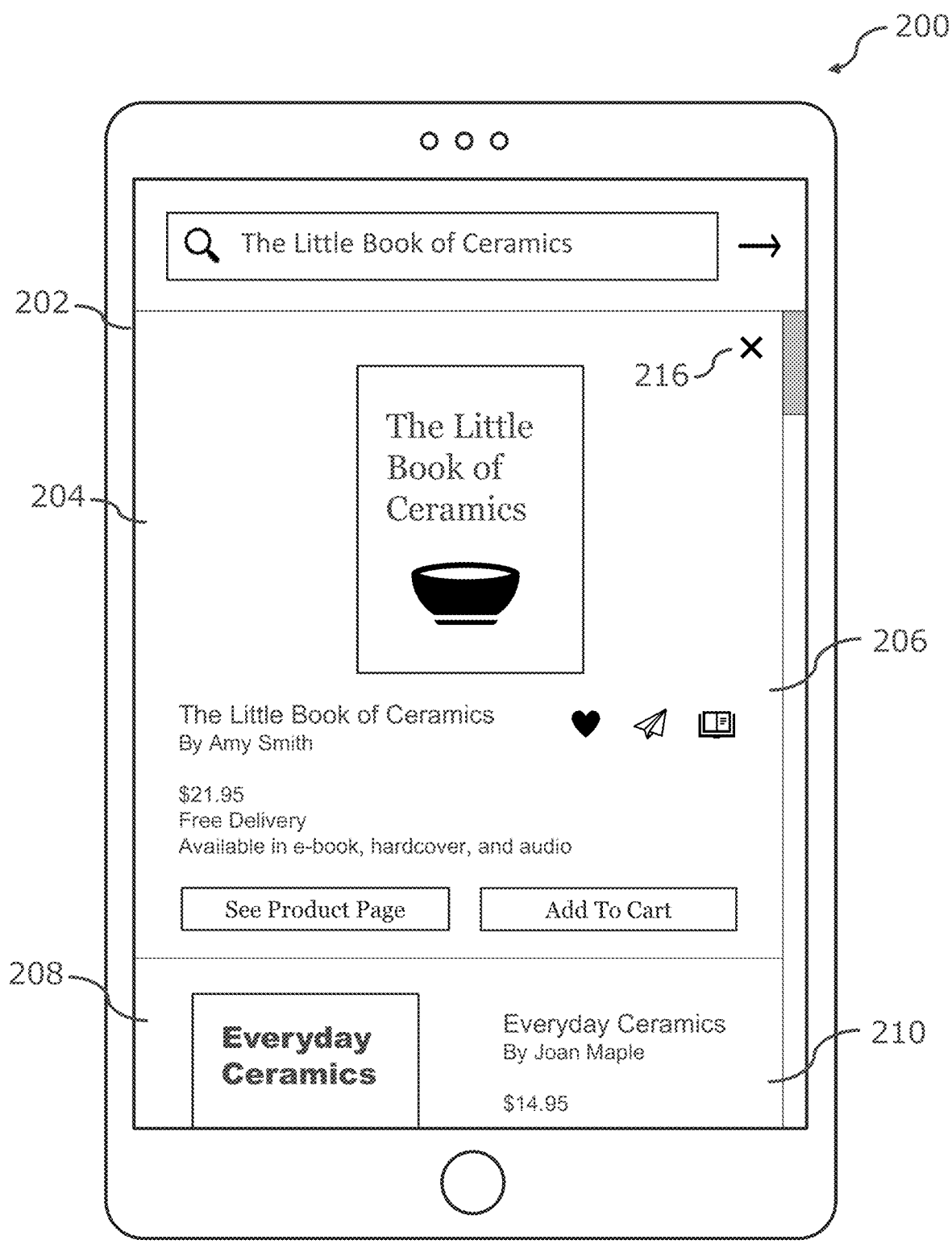
FIG. 2A illustrates a dynamic search results interface, in accordance with example embodiments of the present disclosure.

FIG. 2A illustrates a dynamic search results interface 200, in accordance with example embodiments of the present disclosure. In the dynamic search results interface 200, the search results 202 may be initially loaded with one of the results (i.e., primary search result) 204 in an expanded format 206 while the other results 208 are in a default minimized format 210. In some embodiments, the primary search result 204 may be the highest ranked search result (based on one or more relevance metrics), and appear in a first or top position in the list of search results. FIG. 2A illustrates an example in which the first search result is the primary search result 204 and in the expanded format 206 while subsequent results 208 below the primary search result 204 are in the minimized format 210. Automatically showing the best search result in an expanded format may indicate to the user that their search query was well understood and an item was found with a high degree of confidence that the item is what the user is looking for. It may also better capture the user's attention and stand out from the rest of the search results. The expanded format also includes more content, information, and actions associated with the item. This facilitates and quickens the discovery process and path to purchase. For example, the expanded format includes some of the information and actions options, such as adding to cart, sharing, favoriting, item options, additional description, etc., that are traditionally only available after a user has clicked into a specific product page from the search results page, leaving the search results page. Thus, the expanded format allows the user to access these additional information and options without leaving the results page, and the user can continue to scroll through the other results without having to click into and back from a separate product page. In some embodiments, such as the illustrated example of FIG. 2A, the expanded format 206 takes up more screen space than the minimized format 210.

As mentioned, the primary search result 204 that is automatically shown in the expanded format 206 may be selected based on a plurality of relevance factors, such as but not limited to how well the item fit the query terms (e.g., keyword match), the historical behavior of the specific user (e.g., which items has the user purchased or browsed in the past), the user's profile/biodata/demographic information (or any other data regarding the user), and general user behaviors across the entire or segments of the general customer base (e.g., which items were popular across all or some user). Any of these types of data, among other possible data, may be used to determine which search results to show and specifically which result to show as the primary search result 204 in the expanded format 206.

As illustrated in FIG. 2A, the search results page 202 loads with the primary search result 204 automatically shown in the expanded format while the other results 208 are shown in the minimized format 210. Once the page 202 loads, various forms of user interaction data may be monitored and used to determine whether to dynamically collapse the primary search result 204 from the expanded format 206 to the minimized format 210. This allows more search results to be visible in a single frame of view. For example, if it is detected that the user quickly scrolls away from the primary search result 204 (e.g., less than 2 seconds), it may indicate that the user is not interested in the content of the primary search result 204 presented in the expanded format. Thus, the primary search 204 may be automatically collapsed into the minimized format 210 so the user can better view the other results 208. This allows for more items to be displayed in the list and provides the potential for more options to be visible at once, which may be especially beneficial for users who are searching for a particular item.

User interaction data may include various forms of explicit or implicit user inputs detected, including user navigation data. For example, dwell time and/or scroll speed can be used (e.g., compared to one or more threshold values) to make the determination of whether to automatically collapse from the expanded format 206 to the minimized format 210. For example, if the dwell time is below a threshold duration (e.g., 2 seconds), the primary search result 204 is collapsed from the expanded format 206 to the minimized format 210. Similarly, if the scroll speed is above a threshold speed (e.g., measured in pixels per second), the primary search result 204 is collapsed from the expanded format 206 to the minimized format 210. Such metrics are used as a proxy for user intent and used to interpret whether the user is interested in the expanded content of the primary search result, or if they are more interested in browsing the other search results, or if they are looking for a particular item, etc. Other forms of interaction data include whether the user interacts with any of the search results (e.g., clicks to expand from the minimized format to the expanded format, selects any actionable elements, dwell time). In some embodiments, the time elapsed between when the user scrolls past the primary search result 204 and scrolling back up to the primary search result 204 may also be used to determine whether to collapse the primary search result 204. For example, if the user quickly scrolls back to the primary search result 204 without dwelling on or interacting with other search results, then the primary search result 204 may remain in the expanded format. On the other hand, if the user dwells on and/or interacts with the other search results, then the primary search result 204 may be collapsed. Other forms of user interaction data may include whether the user explicitly interacts with the primary search result 204 in the expanded format 206. For example, whether the user selected any of the selectable elements such as buttons and links. Other forms of user interaction data may include signals from gyroscopic sensors on the client device and eye gaze detection based on one or more cameras on the client device. Other sensors and signals may be also be utilized.

Figure 2B:
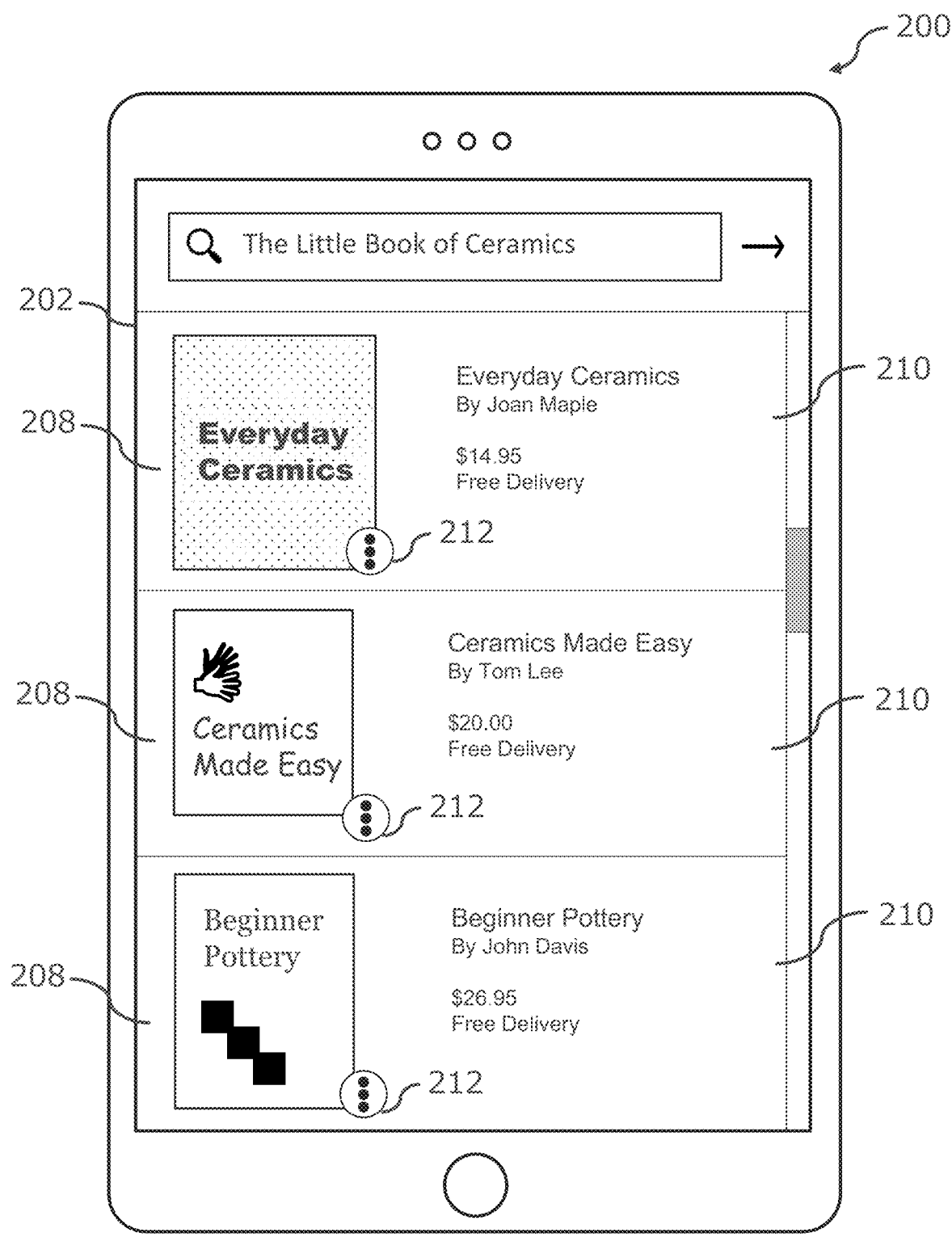
FIG. 2B illustrates a view of the research results page in which the user has scrolled up and past the primary search result, in accordance with example embodiments of the present disclosure.
Figure 2C:
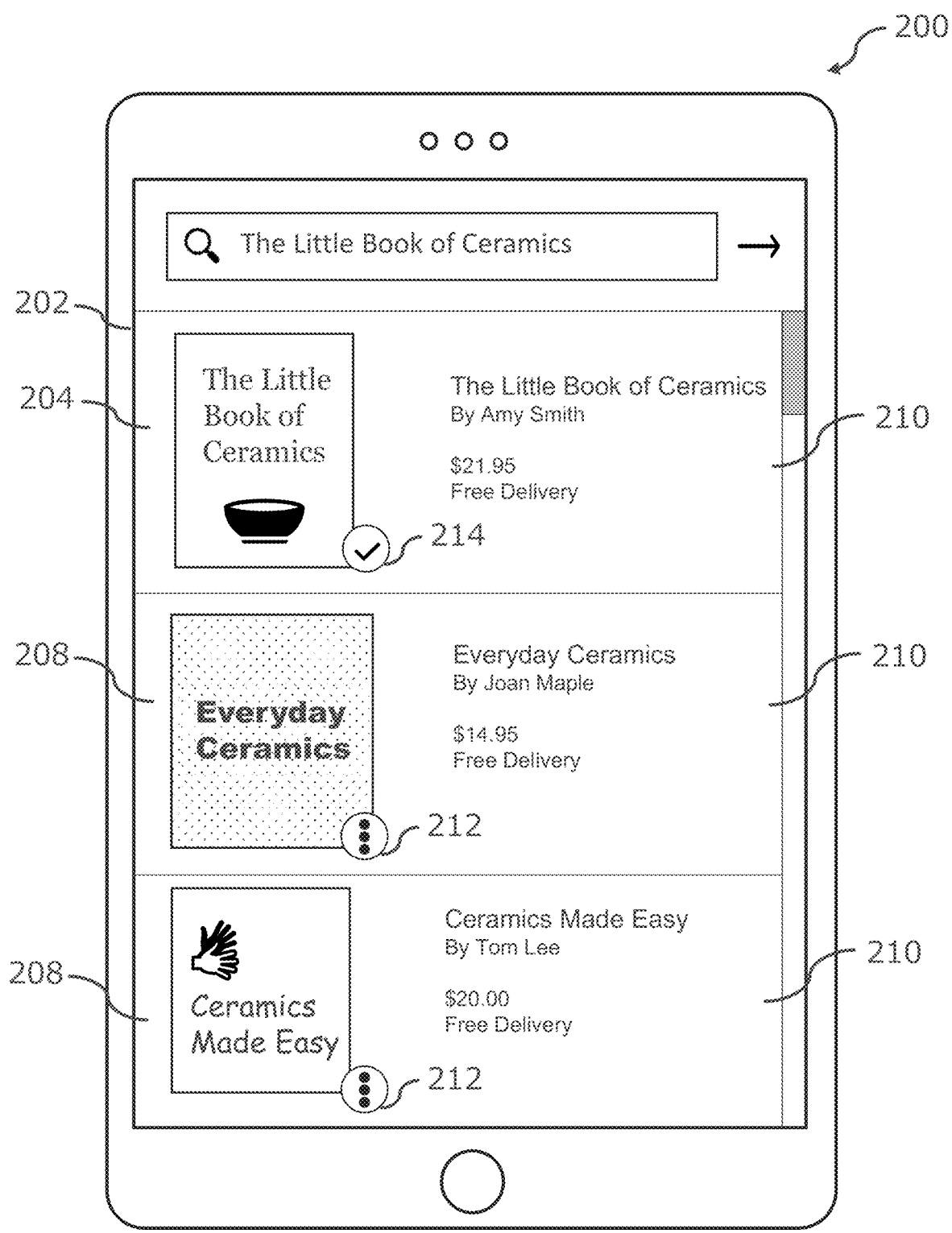
FIG. 2C illustrates the search results page with the primary search result collapsed into the minimized format along with the other search results, in accordance with example embodiments of the present disclosure.

FIG. 2B illustrates a view of the research results page 202 in which the user has scrolled up and past the primary search result 204 (visible in FIG. 2A, not visible in FIG. 2B). Thus, only some subsequent search results 208 in the minimized format 210 are visible in this view. FIG. 2C illustrates the search results page 202 with the primary search result 204 collapsed into the minimized format 210, along with the other search results 208. For example, this is what the page may look like if the user scrolls back up to the top of the search results after the primary search result 204 has been collapsed from the expanded format 206 to the minimized format 210.

In some embodiments, the collapsing action of the primary search result 204 may be visible to the user. For example, as the user begins to scroll down and the collapse conditions are met (e.g., certain scroll speed or scroll distance), the primary search result 204 may be automatically collapsed from the expanded format 206 into the minimized format 210 while still in the frame of view. In such embodiments, the view illustrated in FIG. 2C may follow the view illustrated in FIG. 2A, and FIG. 2B follows FIG. 2C. In some embodiments, the user may scroll too quickly past the primary search result 204 for the collapsing action to be visible. In such embodiments, the view of FIG. 2B follows the view illustrated in FIG. 2A.

In some embodiments, there may be a visual indicator 214 that indicates that the item has already been shown in the expanded format 206. This may help users keep track of the items they've already seen in the expanded format and provide a reduction in evaluation effort as users scroll up the results page to see which products they have already reviewed. In some embodiments, an audible indicator may be used instead of or in addition to the visual indicator.

In some embodiments, search results 208 in the minimized format 210 may include a selectable expand element 212 in which when the user selects (e.g., clicks, touches) the expand element 212, the respective search result will expand from the minimized format 210 to the expanded format 206, while the other search results remain in the minimized format 210. The visual indicator 214 may also serve as an expand element 212. In some embodiments, when an item is shown in the expanded format 206, a close element 216 may be available such the user can collapse the expanded format 206 to the minimized format by selecting the close element 216. In some embodiments, a search result that has been expanded into the expanded format 210 by a user may be automatically closed based on various user interaction data, such as those discussed above.

In some embodiments, refer to FIG. 2A, when the search results are initially loaded, there may not always be a primary search result 204 shown in an expanded format 206. Rather, all of the results may be shown in the minimized format. The search engine determines, based on the search query, whether there is an item that has a high enough relevance to present to the user in the expanded format. For example, if the search query is a specific and unique book title (e.g., "The Little Book of Ceramics" and that book exists in the database, then that item would have a very high relevance and confidence scores, particularly compared to other items. Thus, the search engine would make the determination to show that result as a primary search result 204 in the expanded format 206 since there is high confidence that that item is what the user is looking for, and it would be beneficial to highlight it present additional information or even the option to purchase directly from the search results page. On the other hand, if the search query were for something more generic, such as "ceramics books", and there are many books about ceramics in the database, without any one being particularly more relevant, then the search engine may make the decision to not to show a primary search result 204 in the expanded format 206. Rather, all of the search results may be shown in the minimized format so the user can see more results per view. If however, for example, there is historical information that a majority of users who search for "ceramics books" end up purchasing one book in particularly, that may indicate a significantly higher relevance for that book and it may be shown as a primary search result 204 in the expanded format 206.

In some embodiments, the primary search result 204 that is initially presented in the expanded format 206 may not necessarily be the first or top position search results. Rather, the primary search result 204 that is initially presented in the expanded format 206 may be in any position in the search results. In some embodiments, there may be more than one primary search result 204 that is initially presented in the expanded format 206.

In some embodiments, a search result in the minimized format 210 may be automatically expanded into the expanded format 206 within the search results page 202. Similar to the ability to automatically collapse a search result from the expanded format 206 to the minimized format 210, the determination to automatically expand from the minimized format 210 to the expanded format 206 may be based at least in part on various user interaction data. Thus, the format (i.e., expanded vs minimized) that the search results are presented in may be dynamically and automatically changed based on how the user interacts with the results page 202, with the goal of predicting user intent and presenting the optimal content at any moment.

Figure 2D:
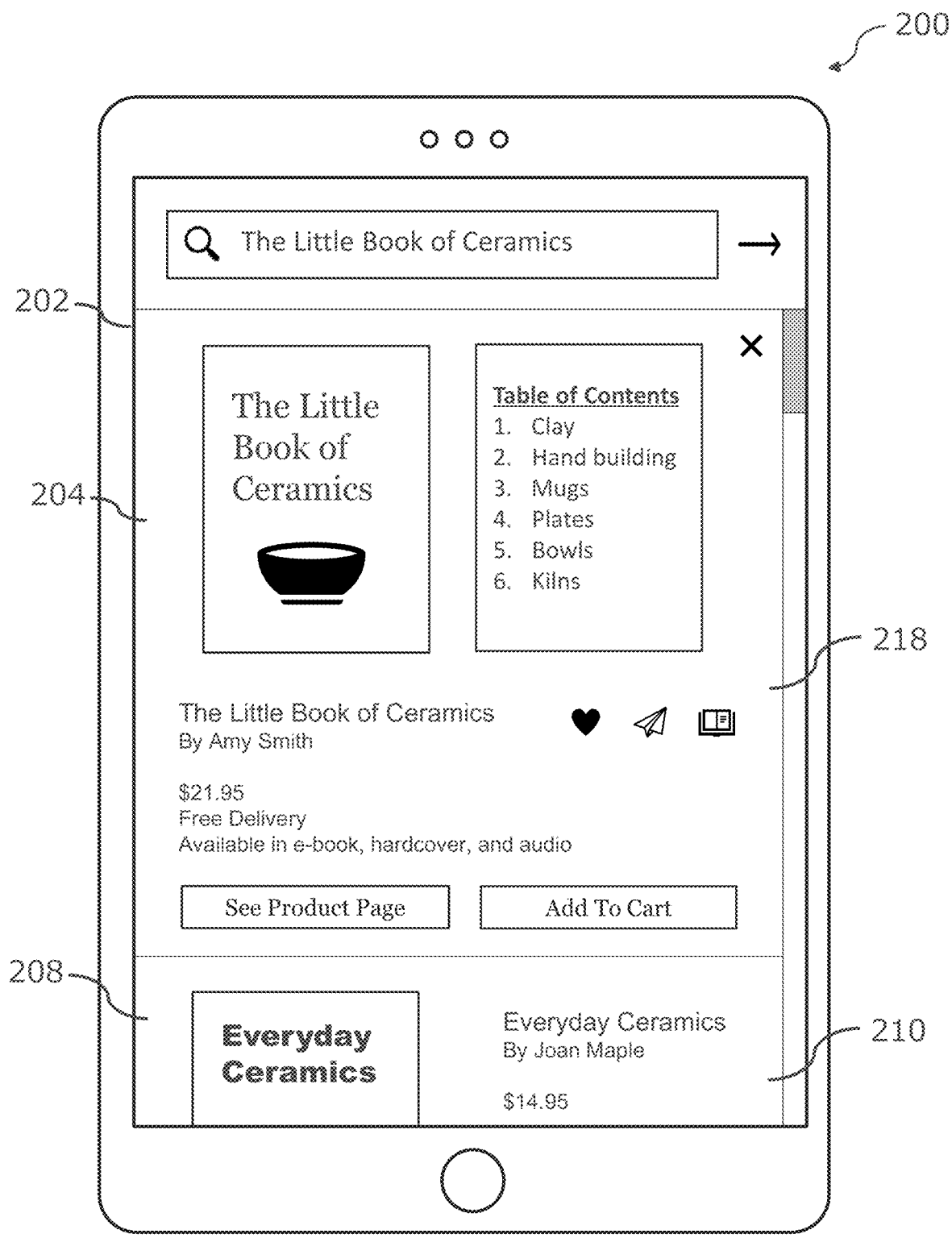
FIG. 2D illustrates such a second expanded format, which include some different information than the original expanded format of FIG. 2A, in accordance with example embodiments of the present disclosure.

As mentioned, FIG. 2C shows the primary search result 204 after it has been collapsed from the expanded format 206 to the minimized format 210. In some embodiments, if a search result is expanded back into the expanded format 206 for a second time, it may be shown in a second expanded format, which includes some different or additional information than the original expanded format 210 that was previously shown. FIG. 2D illustrates such a second expanded format 218, which include some different information than the original expanded format 210 of FIG. 2A. This provides the opportunity for additional content to be presented to the user that they have not seen before. In some embodiments there may also be different or additional interactive elements, such as like links or buttons, that the user can interact with.

Figure 3:
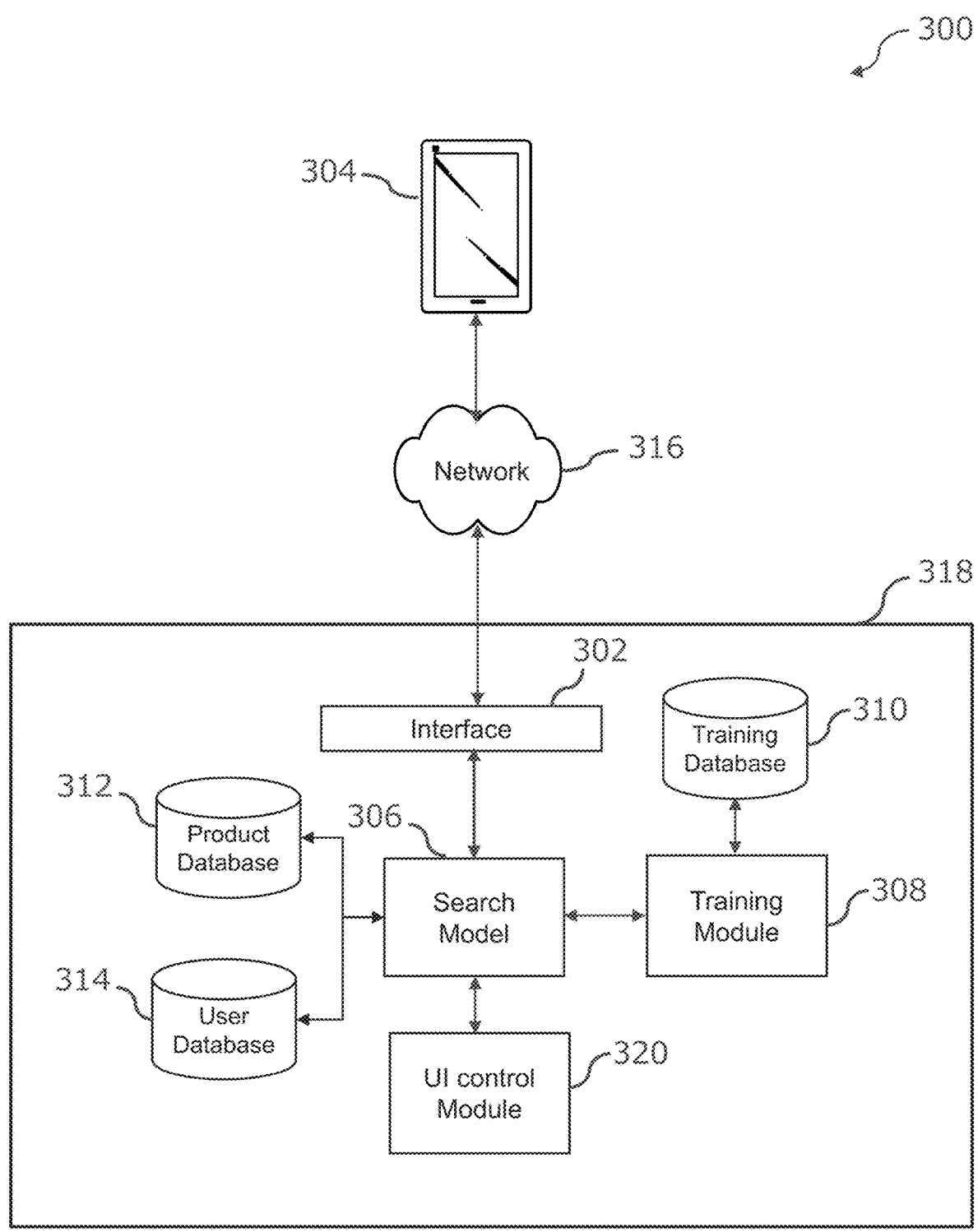
FIG. 3 is a diagram illustrating an example representation of a search system with a service provider search environment in which the present dynamic search results technique is implemented, in accordance with example embodiments.

FIG. 3 is a diagram illustrating an example representation of a search system 300 with a service provider search environment 318 in which the present dynamic search results technique is implemented, in accordance with example embodiments. In an example application, the service provider search environment 318 is used to search for products in a database (e.g., electronic store or catalog) and present them to the user via a search results interface (e.g., results page). In some example applications, the service provider search environment 318 may be used to search for digital content, recommendations, among other forms of content. The service provider search environment 318 includes an interface 302 for facilitating communication with a user device 304 used to conduct a search. The interface 302 receives search parameters (e.g., keywords, selections) entered by the user and generates a search request to be processed by the search model 306. The interface 302 may include any appropriate components known or used to receive requests from across a network 316, such as may include one or more application programming interfaces (APIs) or other such interfaces for receiving such requests. The interface 302 might be owned and operated by the service provider, or leveraged by the service provider as part of a shared resource or "cloud" offering. The network interface layer can receive and analyze the requests from the computing device, and cause at least a portion of the information in the requests to be directed to an appropriate system or service associated with the service provider search environment 318. For example, when a user accesses an application on a user device 304 to request content (e.g., submit a search), the user device 304 may establish a connection with the service provider search environment 318. The user device 304 may receive content via the interface 302. The content may include network resources such as Web pages, content posts, lists, documents, images, videos, and the like. A user of the user device 304 can interact with the content by activating links to other content, submitting search queries, initiating the purchase of items referenced in the content, etc. Information regarding user interactions with the content can be transmitted to the service provider search environment 318 for processing. In addition, information regarding the interactions, or some subset thereof, may be stored for use in training and/or adjusting any appropriate machine learning approaches.

As mentioned, the interface 302 generally facilitates communications between the service provider search environment 318 and the user device 304, both receiving searches from the user device 304 and delivering search results to the user device 304. Specifically, the interface 302 delivers the search request to the search model 306, where the search request is processed to determine the content to be delivered to the user device 304 as search results.

The model 306, upon receiving a search request, selects one or more items from product database 312 to provide to the user device 304 as search results. In some embodiments, the model 306 also ranks the products by one or more ranking schemes such as relevance, a mixed relevance order, or other ranking scheme. The product database 312 includes all the items available and information associated with of each item. The information may include product data such as product name, price, description, category, user reviews and ratings, availability, vendor, shipping method, brand, style, material, color, among many others. Different items may have different types of attributes. The information may also include product statistics, such as total purchases, page views, among many others. The model may utilize one of more of these attributes to determine which products to include in the search results. In some embodiments, the search model 306 accesses a user database 314. The user database 314 stores data about individual users, including information regarding interests, demographic characteristics, user preferences, content interaction (e.g., clicks, likes, shares) and purchasing history, etc. This information may also be used in determining which search results to present.

The system 318 may further include a training module 308 for training the search model 306. In order to select optimal products to present in response to search, the search model 306 is trained. For example, the model 306 may be initially trained before it is deployed. The training module 308 accesses a training database 310 that includes training data used to train the search model 306. In some embodiments, the training data includes historical information of searches conducted by users and their engagement with the search results, as well as attributes of the search results and user data. For example, a data point in the training data may be a search conducted by a user with the search terms "lightweight sneakers", the search results that the user clicked on, saved, added to cart, purchased, etc., and information about those search results, such as price, description, availability, images, etc. The data point may also include the user's demographic data, general engagement behavior, and the like. The training data may include a large number of such data points, so that the model can be trained to optimize for user engagement. In other words, the search model 306 is optimized to select products that will draw high engagement from the user, which means that the results are highly relevant. The model 306 may also be retrained with updated training data on a regular basis (e.g., every week, every month). The model 306 may also be retrained upon certain triggers, such as newly added products or markets, among other events.

The service provider search environment 318 include a user interface control module 320, which utilizes various sources of information, including real-time user interaction data, to dynamically control the search results interface that is presented to the user. Specifically, in some embodiments, the user interface control module 320 dynamically (in real-time) determines whether to show a particularly search result in the expanded format 206 (FIG. 2A) or the minimized format 210 (FIG. 2A), and when to change the format from the expanded format 206 to the minimized format 210, and vice versa. The user interface control module 320 receives data collected by one or more sensors on the user device 304. User interaction data may include various forms of explicit or implicit user inputs detected. For example, dwell time and/or scroll speed can be used (e.g., compared to one or more threshold values) to make the determination of whether to automatically collapse from the expanded format 206 to the minimized format 210. For example, if the dwell time is below a threshold duration (e.g., 2 seconds), the primary search result 204 is collapsed from the expanded format 206 to the minimized format 210. Similarly, if the scroll speed is above a threshold speed (e.g., measured in pixels per second), the primary search result 204 is collapsed from the expanded format 206 to the minimized format 210. Such metrics are used as a proxy for user intent and used to interpret whether the user is interested in the expanded content of the primary search result, or if they are more interested in browsing the other search results, or if they are looking for a particular item, etc. Other forms of interaction data include whether the user interacts with any of the search results (e.g., clicks to expand from the minimized format to the expanded format, selects any actionable elements, dwell time). In some embodiments, the time elapsed between when the user scrolls past the primary search result 204 and scrolling back up to the primary search result 204 may also be used to determine whether to collapse the primary search result 204. For example, if the user quickly scrolls back to the primary search result 204 without dwelling on or interacting with other search results, then the primary search result 204 may remain in the expanded format. On the other hand, if the user dwells on and/or interacts with the other search results, then the primary search result 204 may be collapsed. Other forms of user interaction data may include whether the user explicitly interacts with the primary search result 204 in the expanded format 206. For example, whether the user selected any of the selectable elements such as buttons and links. Other forms of user interaction data may include signals from gyroscopic sensors on the client device and eye gaze detection based on one or more cameras on the client device. Other sensors and signals may be also be utilized.

Additional or alternative components and elements can be used in such a system in accordance with the various embodiments. Accordingly, it should be noted that additional services, providers, and/or components can be included in such a system, and although some of the services, providers, components, etc. are illustrated as being separate entities and/or components, the illustrated arrangement is provided as an example arrangement and other arrangements as known to one skilled in the art are contemplated by the embodiments described herein. The service provider search environment 318 may be implemented on one or more physical server computing devices that provide computing services and resources to users. In some embodiments, the search system 300 may be implemented on one or more host devices, such as blade servers, midrange computing devices, mainframe computers, desktop computers, or any other computing device configured to provide computing services and resources. For example, a single host device may execute one or more content servers, one or more group generators, various data stores, some combination thereof, etc. The content management system may include any number of such hosts. In some embodiments, the features and services provided by the service provider search environment 318 may be implemented as web services consumable via a communication network. In further embodiments, the content management system (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a cloud computing environment.

Individual user devices 304 may be any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. A user may operate a user device to access and interact with content managed by the service provider search environment 318. In some embodiments, a user may launch specialized application software, such as a mobile application executing on a particular user device, such as a smart phone or tablet computer. The application may be specifically designed to interface with the content management system for accessing and interacting with content. In some embodiments, a user may use other application software, such as a browser application, to interact with the content management system.

Figure 4:
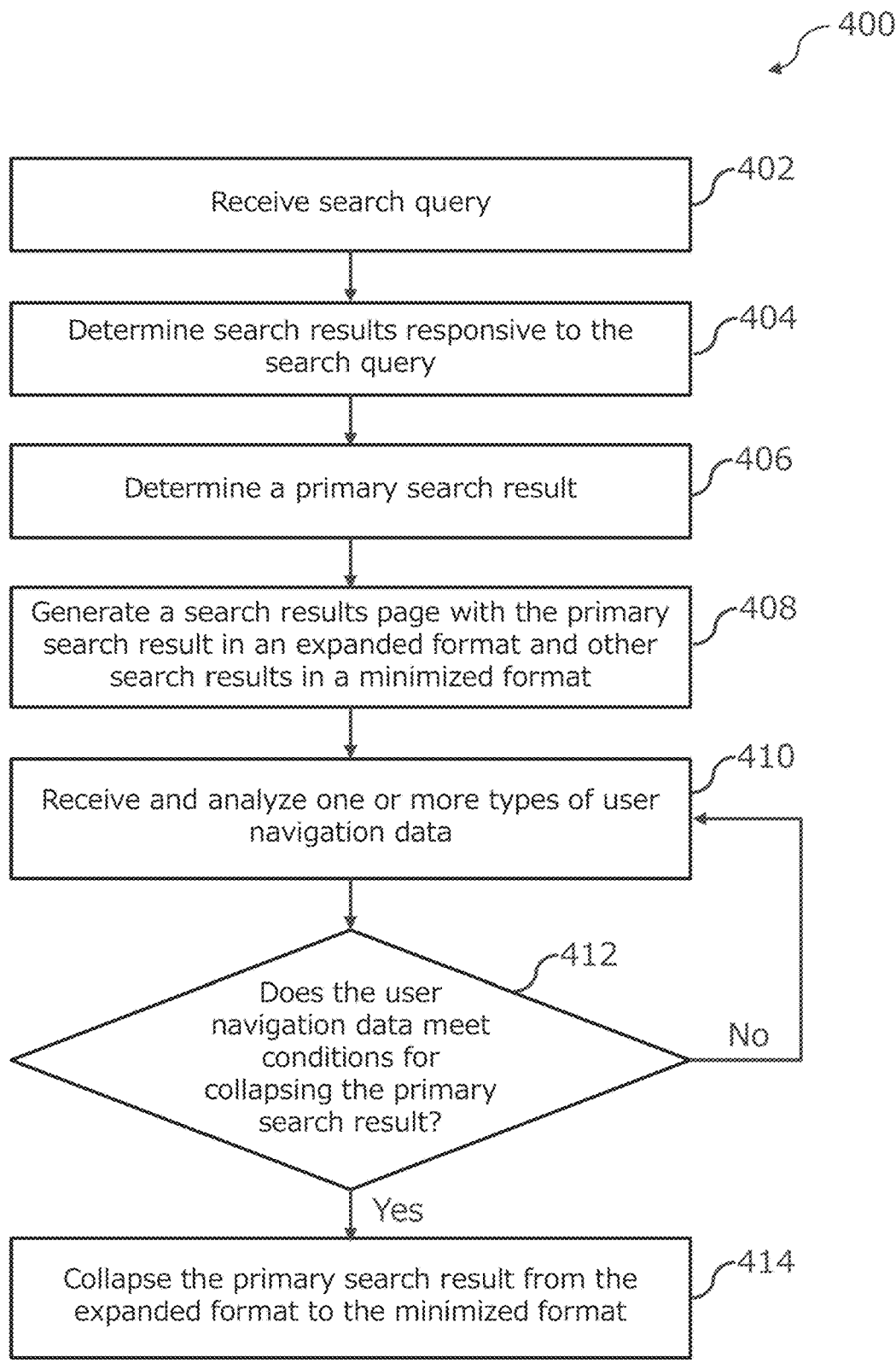
FIG. 4 is a flow chart illustrating a method of dynamically adjusting a search results interface based on detected user interaction data, in accordance with certain embodiments.

FIG. 4 is a flow chart 400 illustrating a method of dynamically adjusting a search results interface based on detected user interaction data, in accordance with certain embodiments. It should be understood that, for this and other processes discussed herein, there can be additional, fewer, or alternative steps, performed in similar or alternative steps, or in parallel, within the scope of the various embodiments unless otherwise stated. In this example, a search query is received 402 at a server-side environment such as an e-commerce platform or search service provider. The search query may be sent from a client device that a user is using to search for and access content and products available. The search query is used to determine 404 search results that are responsive (e.g., relevant) to the search query. For example, a database of items/content may be searched to find relevant items to present as search results for the search query. A primary search result is also determined 406. In some embodiments, the primary search result may be the highest ranked search result (based on one or more relevance metrics). A search results page is then generated 408 in which the primary search result is presented in the expanded format and the other results are presents in a minimized format. In some embodiments, the primary search result may appear in a first or top position on a results search page.

One or more types of user navigation data are then received and analyze 410 in order to determine 412 whether the user navigation data meet conditions for automatically collapsing the primary search result from the expanded format to the minimized format. For example, as mentioned, user navigation data may include various forms of explicit or implicit user inputs detected. Dwell time and/or scroll speed are examples of conditions that can be used (e.g., compared to one or more threshold values) to make the determination of whether to automatically collapse from the expanded format to the minimized format. For example, if the dwell time is below a threshold duration (e.g., 2 seconds), the primary search result is collapsed from the expanded format to the minimized format. Similarly, if the scroll speed is above a threshold speed (e.g., measured in pixels per second), the primary search result is collapsed from the expanded format to the minimized format. Such metrics are used as a proxy for user intent and used to interpret whether the user is interested in the expanded content of the primary search result, or if they are more interested in browsing the other search results, or if they are looking for a particular item, etc.

If the user navigation data does meet conditions for collapsing the primary search result from the expanded format to the minimized format, then the primary search result is automatically collapsed 414 from the expanded format to the minimized format. Otherwise, the user interaction data is continuously received and analyzed 410.

It should be noted that although the present systems and techniques are described in the context of a search application for illustrative purposes, the present systems and techniques are useful in applications other than search. The present techniques of displaying a primary item in a collection of items in an expanded view and then automatically collapsing the primary item into the minimized view based on various user navigation data may be applied to any user interface in which a collection of items is displayed. For example, when a user accesses the homepage of an e-commerce platform, a collection of items may be automatically displayed on the homepage and the display format of the items are dynamically changeable in accordance with the present techniques.

Figure 5:
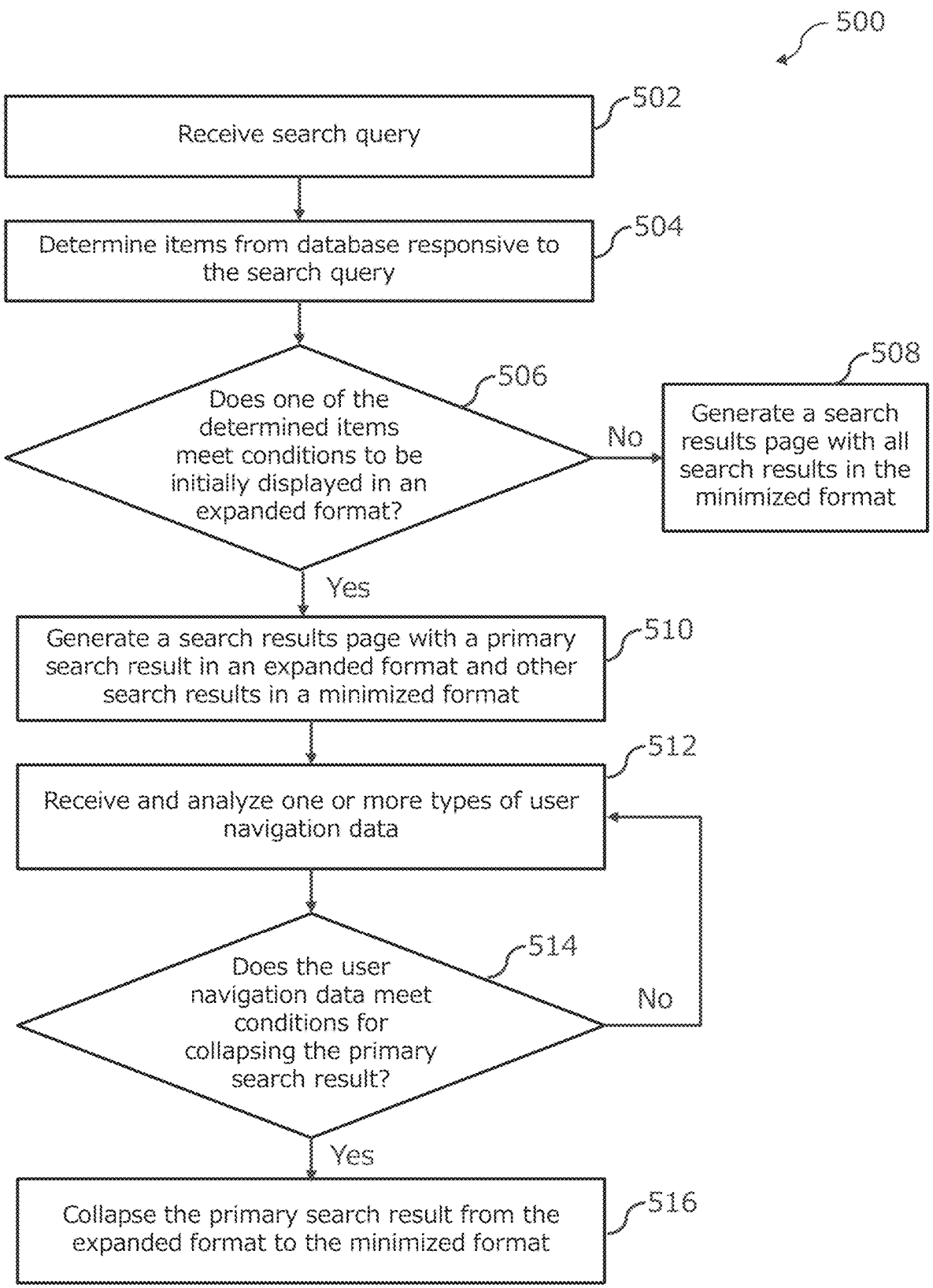
FIG. 5 is a flow chart illustrating a method of adjusting a search results interface based on detected user interaction data and whether to initially present a primary search result in an expanded format, in accordance with certain embodiments.

FIG. 5 is a flow chart 500 illustrating a method of adjusting a search results interface based on detected user interaction data, and whether to initially present a primary search result in an expanded format, in accordance with certain embodiments. In this example, a search query is received 502 at a server-side environment such as an e-commerce platform or search service provider. The search query is used to determine 504 search results that are responsive (e.g., relevant) to the search query. A determination 506 is also made of whether one or the determined items meets one or more conditions to displayed as a primary search result in the expanded format. If there is an item that meets the conditions to be initially presented in the expanded format, then a search results page is generated 510 with the primary search result in the expanded format and other search results in the minimized format. If none of the items meet the conditions, then a search results page is generated 508 with all the search results in the minimized format.

Specially, it can be determined by the search model, based on the search query, whether there is an item that has a high enough relevance to present to the user in the expanded format. For example, if the search query is a specific and unique book title, and that book exists in the database, then that item would have a very high relevance and confidence scores, particularly compared to other items. Thus, the search engine would make the determination to show that result as a primary search result in the expanded format since there is high confidence that that item is what the user is looking for, and it would be beneficial to highlight it present additional information or even the option to purchase directly from the search results page. On the other hand, if the search query were for something more generic, such as "cat books", and there are many books about cats in the database, without any one being particularly more relevant, then the search engine may make the decision to not to show a primary search result in the expanded format. Rather, all of the search results may be shown in the minimized format so the user can see more results per view. If however, for example, there is historical information that a majority of users who search for "cat books" end up purchasing one book in particularly, that may indicate a significantly higher relevance for that book and it may be shown as a primary search result in the expanded format.

One or more types of user navigation data are then received and analyze 512 in order to determine 514 whether the user navigation data meet conditions for automatically collapsing the primary search result from the expanded format to the minimized format. If the user navigation data does meet conditions for collapsing the primary search result from the expanded format to the minimized format, then the primary search result is automatically collapsed 516 from the expanded format to the minimized format. Otherwise, the user navigation data is continuously received and analyzed 512.

Figure 6:
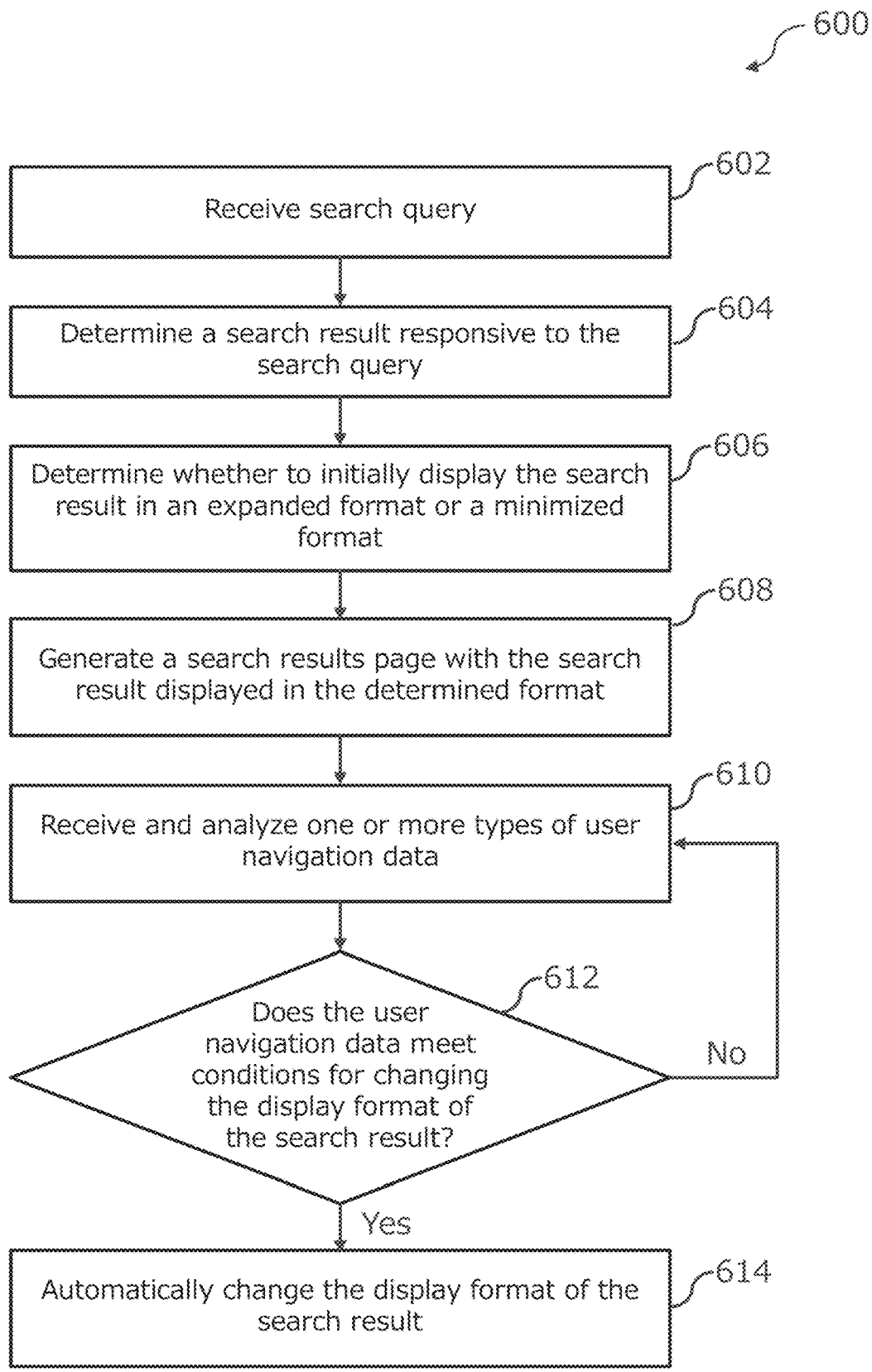
FIG. 6 is a flow chart illustrating a method of dynamically adjusting a search results interface, in accordance with certain embodiments.

FIG. 6 is a flow chart 600 illustrating a method of dynamically adjusting a search results interface, in accordance with certain embodiments. In this example, a search query is received 602 at a server-side environment such as an e-commerce platform or search service provider. The search query is used to determine 604 one or more search results that are responsive (e.g., relevant) to the search query. For an individual search result of the one or more search results, it is also determined 606 whether to initially display the search result in the expanded format or the minimized format. This may be based at least in part on some of the conditions described above for initially displaying a search result in the expanded format. A search results page is generated 608 with the search result displayed in the determined format. One or more types of user navigation data may be received and analyzed 610 to determine 612 whether the user navigation data meet conditions for changing the display format of the search result. If the conditions are met, then the display format of the search result is automatically changed 614. For example, if the search result was initially displayed in the expanded format, the search result may be changed from the expanded format to the minimized format if the respective conditions are met. Similarly, if the search result was initially displayed in the minimized format, and the respectively conditions are met for expanding the search result, then the format may be changed from the minimized format to the expanded format. If the respective conditions are not met, then the format is not changed and the user interaction data is continuously received and analyzed 610.

Figure 7:
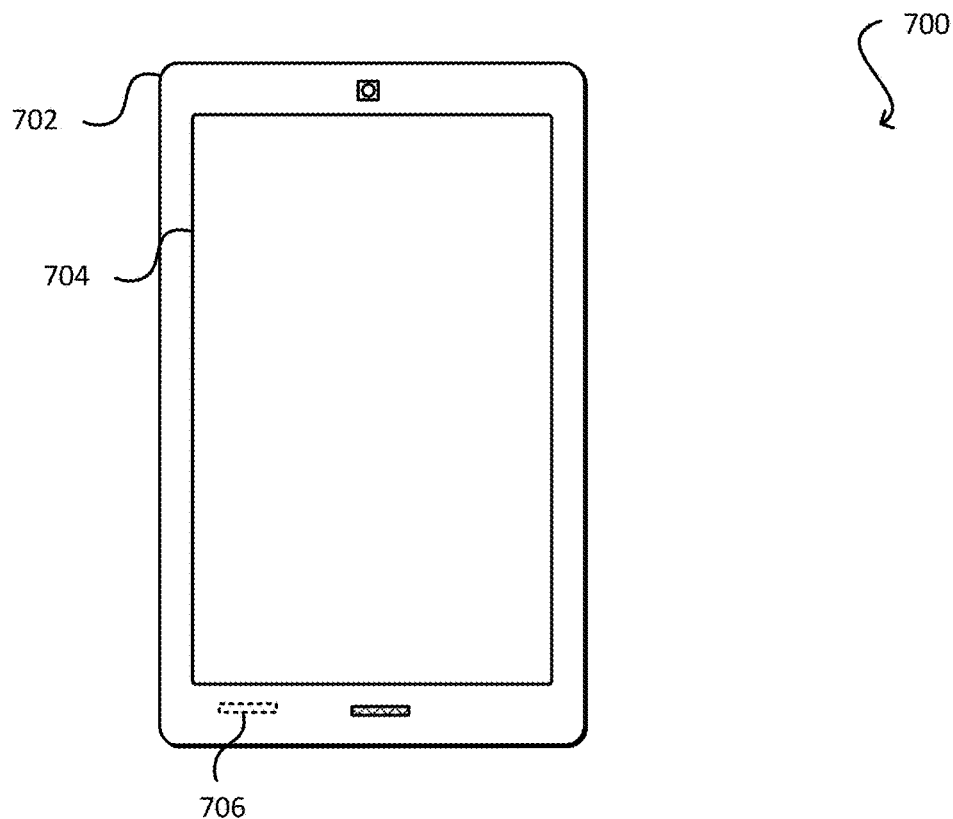
FIG. 7 example computing device that can be use in accordance with various embodiments.

FIG. 7 illustrates an example computing device 700 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others. In this example, the computing device 700 has a display screen 702 and an outer casing. The display screen under normal operation will display information to a user (or viewer) facing the display screen (e.g., on the same side of the computing device as the display screen). As discussed herein, the device can include one or more communication components 704, such as may include a cellular communications subsystem, Wi-Fi communications subsystem, BLUETOOTH® communication subsystem, and the like.

Figure 8:
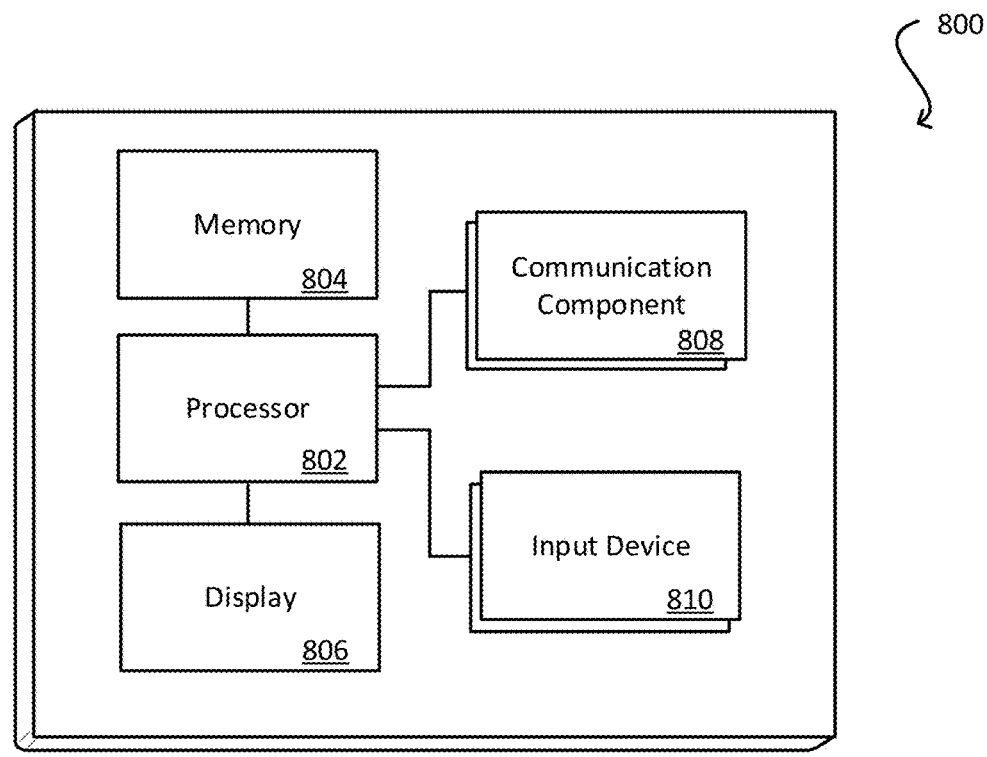
FIG. 8 illustrates a set of basic components of one or more devices of the present disclosure.

FIG. 8 illustrates a set of basic components of one or more devices 800 of the present disclosure. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device typically will include at least one type of display element 806, such as a touch screen, electronic ink (e-ink), organic light emitting diode (OLED) or liquid crystal display (LCD), although devices such as portable media players might convey information via other means, such as through audio speakers. The device can include at least one communication component 808, as may enabled wired and/or wireless communication of voice and/or data signals, for example, over a network such as the Internet, a cellular network, a Wi-Fi network, BLUETOOTH®, and the like. The device can include at least one additional input device 810 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device. As discussed, different approaches can be implemented in various environments in accordance with the described embodiments.

Figure 9:
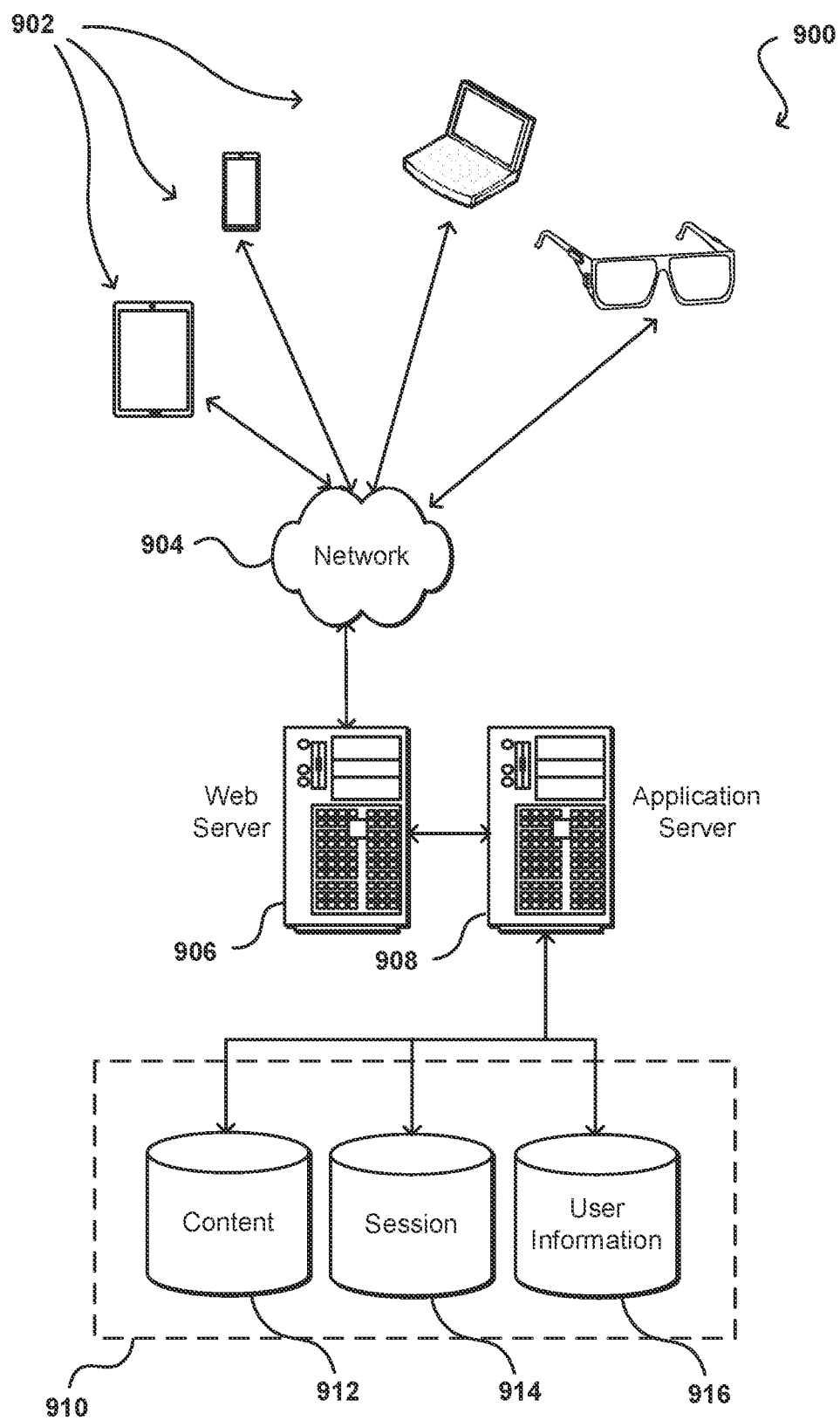
FIG. 9 illustrates an example environment for implementing aspects in accordance with various embodiments.

FIG. 9 illustrates an example environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term data "store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type.

The information can then be returned to the user, such as in a results listing on a Web page that the user is able to view via a browser on the user device 902. Information for a particular item of interest can be viewed in a dedicated page or window of the browser. Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein. The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network. Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof In embodiments utilizing a Web server, the Web server can run any of a variety of server or mid-tier applications, including HTTP servers, FTP servers, CGI servers, data servers, Java servers and business application servers.

The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®. The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker).

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor; and
   a memory device including instructions that, when executed by the at least one processor, cause the system to:
   receive a search query from a client device for items in an electronic catalog;
   determine, in response to receipt of the search query, a plurality of items from the electronic catalog that meet one or more relevance criteria related to the search query;
   transmit one or more instructions to the client device, the instructions causing the client device to display a search results page including a plurality of search results corresponding to the plurality of items;
   identify one of the plurality of search results as a primary search result based on one or more predefined criteria, wherein the primary search result of the plurality of search results is displayed in an expanded format and other search results of the plurality of search results are displayed in a minimized format along with the primary search result;
   detect user navigation data with respect to the search results page;
   determine that the user navigation data meet one or more conditions for collapsing the primary search result from the expanded format to the minimized format; and
   automatically collapse the primary search result from the expanded format to the minimized format.

2. The system of claim 1, wherein the plurality of search results are displayed in ordered positions on the search results page, and the primary search result is displayed in a first position.

3. The system of claim 1, wherein the user navigation data include at least one of a dwell time or a scroll speed.

4. The system of claim 1, wherein the instructions when executed by the at least one processor further cause the system to:
   expand the primary search result from the minimized format to a second expanded format, wherein the second expanded format includes different content than the expanded format.

5. A computer-implemented method, comprising:
   receiving a request for content from a client device;
   transmitting one or more instructions to the client device, the instructions causing the client device to display an interface that includes a plurality of items responsive to the request;
   identifying an individual item of the plurality of items based on one or more predefined criteria, wherein the individual item in the plurality of items is displayed in an expanded format while the other items of the plurality of items are displayed in a minimized format, wherein the plurality of items are determined based on the request for content;
   detecting user navigation data with respect to the interface; and
   changing the format of the individual item from the expanded format to the minimized format based at least in part on the user navigation data, wherein information about the individual item in the plurality of items is displayed in the expanded format, and the individual item in the expanded format is displayed with the other items of the plurality of items in the minimized format.

6. The method of claim 5, wherein the minimized format includes a minimum amount of content associated with an item, and wherein the expanded format includes more content than the minimized format.

7. The method of claim 5, wherein the expanded format takes up more space on the interface than the minimized format.

8. The method of claim 5, wherein the user navigation data includes at least one of scroll speed, dwell time, user selection, eye gaze, accelerometer data, camera data, galvanometer data, or gyroscope data.

9. The method of claim 5, further comprising:
   detecting a scroll speed or dwell time with respect to the search results interface;

determining that the scroll speed or dwell time meet one or more thresholds; and automatically changing the individual search result from the expanded format to the minimized format.

10. The method of claim 5, further comprising:

displaying a search result in the expanded format and other search results in the minimized format;

detecting a user interaction;

changing one of the other search results from the minimized format to the expanded format; and changing the search result already in the expanded format to the minimized format.

11. The method of claim 5, wherein the plurality of search results are displayed in ordered positions on the search results page, and further comprising:

displaying the individual search result in the first position in the expanded format.

12. The method of claim 5, further comprising:

changing the format of the individual search result from the expanded format to the minimized format; and displaying, on the individual search result in the minimized format, a visual indicator that the individual search result was previously displayed in the expanded format.

13. The method of claim 5, further comprising:

displaying a search result of the plurality of search results in an initial expanded format;

changing the format of the search result from the initial expanded format to the minimized format; and changing the format of the search result from the minimized format to a second expanded format, wherein the second expanded format includes at least some different content than the initial expanded format.

14. The method of claim 5, wherein the request for content includes a search query, and the plurality of items includes a plurality of search results.

15. The method of claim 14, further comprising:

determining that an individual search result of the plurality of search results meets one or more confidence conditions with respect to the search query; and displaying the individual search result in the expanded format and other search results in the plurality of search results in the minimized format.

16. The method of claim 15, wherein the one or more confidence conditions are based at least in part on relevance of the product with respect to the search query, wherein relevance is based at least in part on any combination of keyword match, historical user behavior, or user profile.

17. A system, comprising:

at least one processor; and a memory device including instructions that, when executed by the at least one processor, cause the system to:

receive a request for content from a client device;

transmit one or more instructions to the client device, the instructions causing the client device to display an interface that includes a plurality of items responsive to the request;

identify at least one items of the plurality of items based on one or more predefined criteria, wherein the at least one items of the plurality of items is displayed in an expanded format while other items of the plurality of items are displayed in a minimized format, wherein the plurality of items are determined based on the request for content;

detect user navigation data with respect to the interface; and change the format of the at least one item from the expanded format to the minimized format based at least in part on the user navigation data, wherein information about the individual item in the plurality of items is displayed in the expanded format, and the individual item in the expanded format is displayed with the other items of the plurality of items in the minimized format.

18. The system of claim 17, wherein the instructions when executed by the at least one processor further cause the system to:

determine that the at least one item meets one or more confidence conditions with respect to the search query; and display the at least one item in the expanded format and other items in the plurality of items in the minimized format.

19. The system of claim 17, wherein the instructions when executed by the at least one processor further cause the system to:

display an item in the expanded format and other items in the plurality of items in the minimized format;

detect a user interaction;

change one of the other items from the minimized format to the expanded format; and change the item already in the expanded format to the minimized format.

20. The system of claim 17, wherein the instructions when executed by the at least one processor further cause the system to:

display an item of the plurality of items in an initial expanded format;

change the format of the item from the initial expanded format to the minimized format; and change the format of the item from the minimized format to a second expanded format, wherein the second expanded format includes some different content than the initial expanded format.

* * * * *